United States Patent
Igarashi

(10) Patent No.: US 7,675,921 B2
(45) Date of Patent: Mar. 9, 2010

(54) INFORMATION PROCESSING APPARATUS, INFORMATION PROCESSING METHOD, AND SYSTEM

(75) Inventor: Toshiaki Igarashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 422 days.

(21) Appl. No.: 11/675,858

(22) Filed: Feb. 16, 2007

(65) Prior Publication Data

US 2007/0201489 A1    Aug. 30, 2007

(30) Foreign Application Priority Data

Feb. 28, 2006    (JP)    ............... 2006-053799

(51) Int. Cl.
*H04L 12/28* (2006.01)
(52) U.S. Cl. .................. 370/395.53; 709/220; 709/225
(58) Field of Classification Search ........................ None
See application file for complete search history.

(56) References Cited

U.S. PATENT DOCUMENTS 5,968,126 A * 10/1999 Ekstrom et al. ............. 709/225

2004/0037295 A1 * 2/2004 Tanaka et al. .......... 370/395.53
2005/0114507 A1 * 5/2005 Tarui et al. ................... 709/224

FOREIGN PATENT DOCUMENTS

| JP | 10-283322   | 10/1998 |
| JP | 2002-204247 | 7/2002  |

* cited by examiner

*Primary Examiner*—Ayaz R Sheikh
*Assistant Examiner*—Nicholas Sloms
(74) *Attorney, Agent, or Firm*—Cowan, Liebowitz & Latman, P.C.

(57) ABSTRACT

This invention provides a technique for safely and readily managing a network device. To achieve this object, an authentication server (105) performs an authentication process by using a set of a login ID and password transmitted from a manager server apparatus (103), and transmits the authentication result to a multi-functional peripheral (102). The authentication server (105) also specifies a VLAN name corresponding to this set, and transmits the VLAN name to a DHCP server (106). The DHCP server (106) determines connection setting information corresponding to the VLAN name, and transmits the determined connection setting information to the multi-functional peripheral (102). The multi-functional peripheral (102) connects to VLAN 2 by using the obtained connection setting information.

10 Claims, 11 Drawing Sheets

F I G. 6
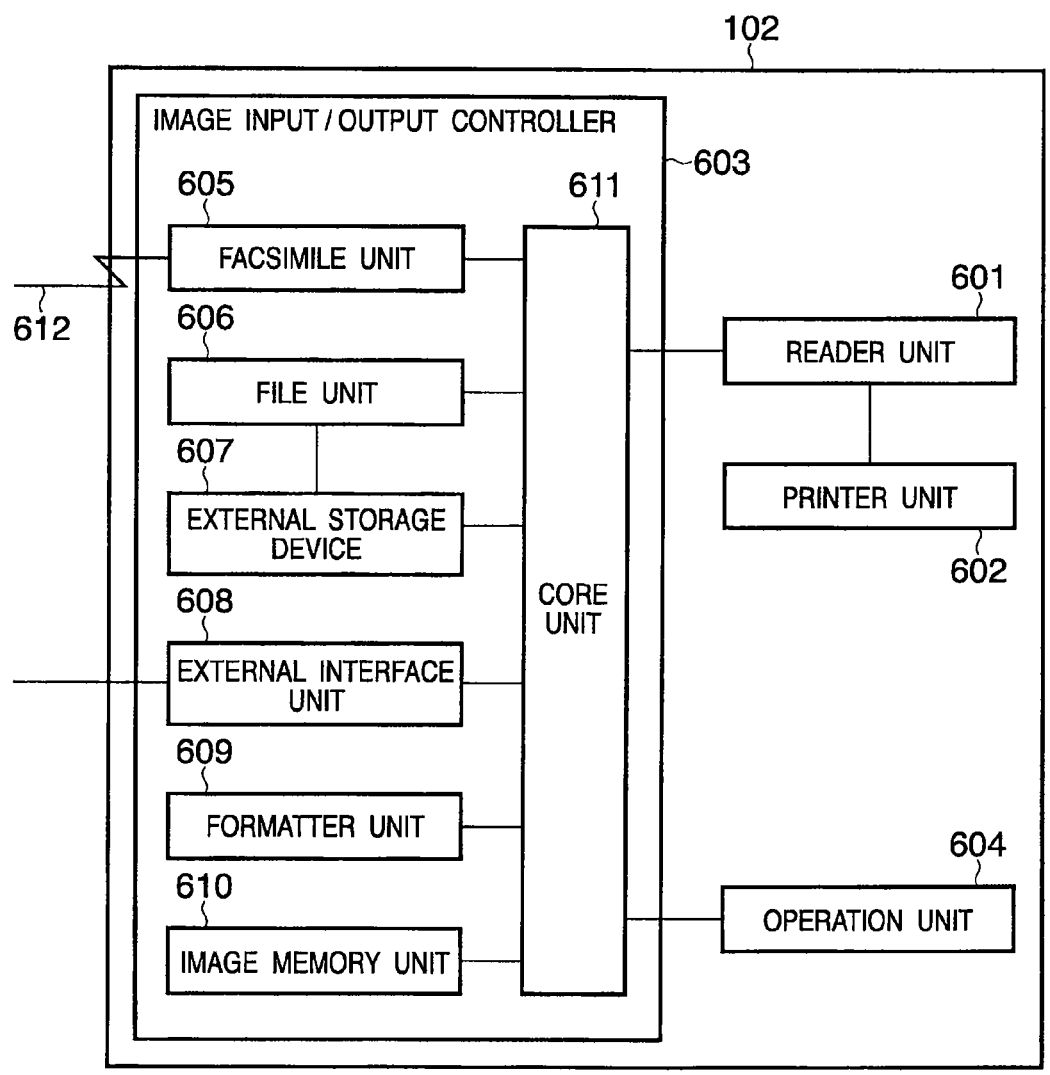

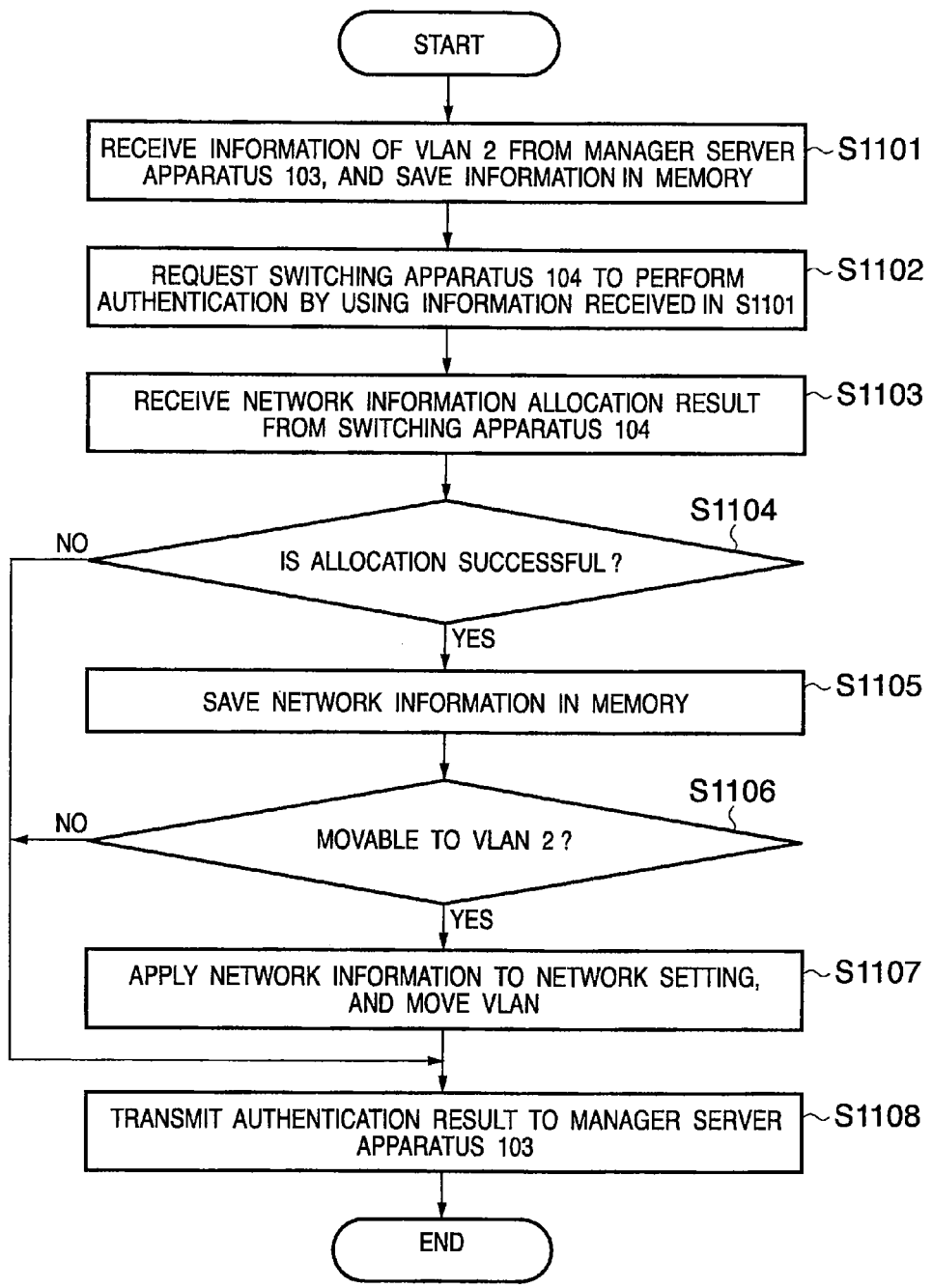

INFORMATION PROCESSING APPARATUS, INFORMATION PROCESSING METHOD, AND SYSTEM

BACKGROUND OF THE INVENTION

1. Field of the Invention

The present invention relates to an information processing technique in a virtual network.

2. Description of the Related Art

Recently, a VLAN (Virtual LAN) technique for setting a virtual group of network devices independently of a physical connection form is beginning to be established in a network (LAN) (e.g., Japanese Patent Laid-Open No. 2002-204247).

The VLAN technique can set a group to which a network device belongs on the basis of the MAC address or IP address of the network device or information of the user using the network device. As a consequence, even when the network device is physically moved, the settings need not be changed. This saves the network manager the trouble of building a network, and makes the VLAN technique highly convenient for the network manager.

On the other hand, even when a network device is connected to a network using the VLAN technique, this does not necessarily reduce the load on a management operation performed by a network device manager who manages the network device itself.

Generally, it is important for a network device manager to safely manage the resources (firmware, data, and system data) of each individual network device. Therefore, a network device manager manages the resources by directly operating a network device by disconnecting it from a network. Especially when performing a management operation such as firmware update which requires high safety, a network device manager observes the operation procedure strictly. Even when a network device is connected to a network using the VLAN technique, therefore, if the network device is used in a remote place, management is still difficult to perform.

On the other hand, a method of managing a network device from a remote place by using software for managing the network device is proposed (e.g., Japanese Patent Laid-Open No. 10-283322). This method allows a network device manager to easily manage a network device in a remote place.

When this method is used, however, even while a network device manager is performing a management operation on a network device in a remote place, another user can access the network device. That is, this method facilitates the management operation but cannot well ensure the safety.

As described above, a demand has arisen for allowing a network device manager to safely and readily manage a network device connected to a network using the VLAN technique.

SUMMARY OF THE INVENTION

The present invention has been made in consideration of the above situation, and has as its object to provide a technique for "safely and easily" managing a network device.

To achieve the object of the present invention, an information processing apparatus according to the present invention has the following arrangement. That is, an information processing apparatus connected to a first virtual network as a virtual network, comprising:

a designating unit configured to designate, as an apparatus to be managed, an apparatus on which the information processing apparatus executes specific processing, among apparatuses connected to a second virtual network different from the first virtual network;

a transmitting unit configured to transmit, to the apparatus to be managed, authentication information necessary to connect to the first virtual network;

a receiving unit configured to receive, from the apparatus to be managed, information indicating whether the apparatus to be managed has connected to the first virtual network by using the authentication information; and a processing unit configured to access the apparatus to be managed and execute specific processing, when receiving information indicating that the apparatus to be managed has connected to the first virtual network.

To achieve the object of the present invention, a system of the present invention has the following arrangement. That is, a system comprising an information processing apparatus connected to a first virtual network as a virtual network, an authentication server connected to a second virtual network and having an authentication function, a network setting issuing server having a network setting function, and an apparatus which performs predetermined processing, wherein the information processing apparatus comprises:

a designating unit configured to designate, as an apparatus to be managed, an apparatus on which the information processing apparatus executes specific processing, among apparatuses connected to the second virtual network;

a first transmitting unit configured to transmit, to the apparatus to be managed, authentication information necessary to connect to the first virtual network;

a first receiving unit configured to receive, from the apparatus to be managed, information indicating whether the apparatus to be managed has connected to the first virtual network by using the authentication information; and a processing unit configured to access the apparatus to be managed and execute specific processing, when receiving information indicating that the apparatus to be managed has connected to the first virtual network, the apparatus to be managed comprises:

a second receiving unit configured to receive the authentication information transmitted by the first transmitting unit;

a second transmitting unit configured to transmit the authentication information received by the second receiving unit to the authentication server;

a third receiving unit configured to receive an authentication result which is transmitted from the authentication server as a result of an authentication process performed by the authentication server by using the authentication information, and indicates whether the apparatus to be managed is connectable to the first virtual network, and to receive connection setting information from the network setting issuing server if the apparatus to be managed is connectable;

a connection processing unit configured to perform a connection process of connecting the apparatus to be managed to the first virtual network by using the connection setting information if the apparatus to be managed is connectable to the first virtual network; and a third transmitting unit configured to transmit the authentication result to the information processing apparatus, the authentication server comprises:

a first holding unit configured to hold a set of the authentication information and virtual network information corresponding to the authentication information and indicating a connectable virtual network;

a search unit configured to search the first holding unit for virtual network information corresponding to the authentication information transmitted by the second transmitting unit, thereby performing an authentication process; and a fourth transmitting unit configured to transmit, to the apparatus to be managed, an authentication result indicating that the apparatus to be managed is connectable to the first virtual network, if the virtual network information corresponding to the authentication information transmitted by the second transmitting unit is held in the first holding unit, and to transmit the corresponding virtual network information to the network setting issuing server, and the network setting issuing server comprises:

a second holding unit configured to hold a set of the virtual network information and the connection setting information; and a fifth transmitting unit configured to search the second holding unit for connection setting information corresponding to the virtual network information transmitted by the fourth transmitting unit, and to transmit the connection setting information to the apparatus to be managed.

To achieve the object of the present invention, an information processing method of the present invention has the following arrangement. That is, an information processing method performed by an information processing apparatus connected to a first virtual network as a virtual network, comprising:

a designating step of designating, as an apparatus to be managed, an apparatus on which the information processing apparatus executes specific processing, among apparatuses connected to a second virtual network different from the first virtual network;

a transmitting step of transmitting, to the apparatus to be managed, authentication information necessary to connect to the first virtual network;

a receiving step of receiving, from the apparatus to be managed, information indicating whether the apparatus to be managed has connected to the first virtual network by using the authentication information; and a processing step of accessing the apparatus to be managed and executing specific processing, when information indicating that the apparatus to be managed has connected to the first virtual network is received.

The present invention makes it possible to "safely and readily" manage a network device.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a block diagram showing the hardware configuration of a multi-functional peripheral 102;

FIG. 7 is a flowchart showing the sequence of processing when the manager server apparatus 103 accesses firmware of the multi-functional peripheral 102 connected to a VLAN different from a VLAN to which the manager server apparatus 103 is connected, and performs an updating process or the like;

FIG. 11 is a flowchart showing the sequence of processing executed by the multi-functional peripheral 102 when the manager server apparatus 103 has transmitted the set of the login ID, password, IP address, and subnet mask in step S705, and the multi-functional peripheral 102 has received the set.

DESCRIPTION OF THE EMBODIMENTS

Preferred embodiments of the present invention will now be described in detail in accordance with the accompanying drawings.

First Embodiment

<System>

Figure 1:
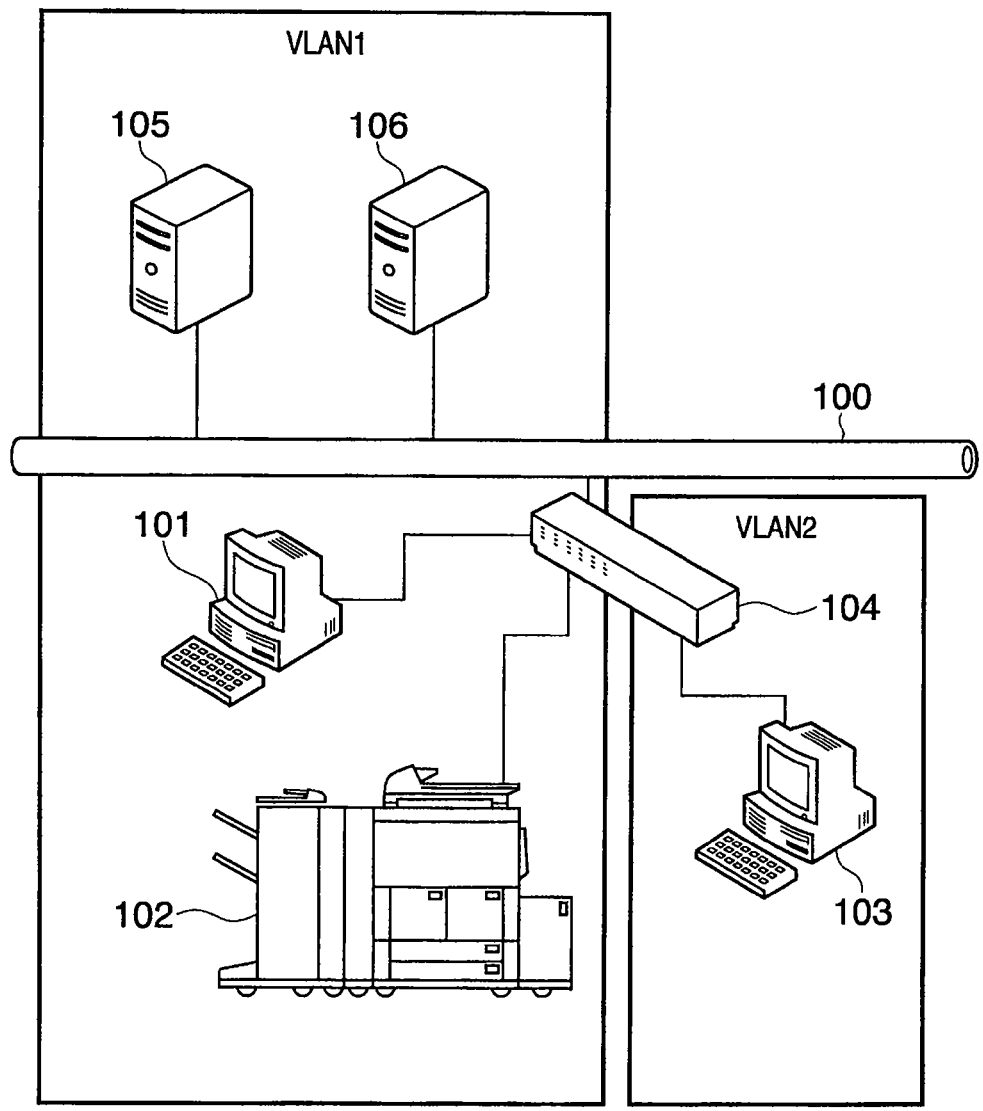
FIG. 1 is a view showing the configuration of a system according to the first embodiment of the present invention.

FIG. 1 is a view showing the configuration of a system according to this embodiment. As shown in FIG. 1, the system according to this embodiment comprises apparatuses 105 and 106 connected to a LAN 100, and apparatuses 101 to 103 connected to the LAN 100 via a switching apparatus 104. The apparatuses 101, 102, 105, and 106 belong (are connected) to VLAN 1, and the apparatus 103 belongs to VLAN 2. The switching apparatus 104 connects VLAN 1 and VLAN 2. The VLAN is a virtual network including a plurality of apparatuses permitted to be connected, and the details are as described above.

The apparatus 101 is a client terminal apparatus, the apparatus 102 is a multi-functional peripheral, the apparatus 105 is an authentication server, and the apparatus 106 is a DHCP server (network setting issuing server). As described above, these apparatuses are configured on VLAN 1 and can communicate data with each other by using VLAN 1.

The apparatus 104 is a switching apparatus, and the apparatus 103 is a manager server apparatus operated by the manager of this system. As described above, the manager server apparatus 103 is configured on VLAN 2. In this embodiment, there is routing from VLAN 2 to VLAN 1, but there is no routing from VLAN 1 to VLAN 2. That is, the manager server apparatus 103 can access the apparatuses configured on VLAN 1, but these apparatuses configured on VLAN 1 cannot access the manager server apparatus 103.

<Client Terminal Apparatus, Authentication Sever, DHCP Server, and Manager Server Apparatus>

Figure 5:
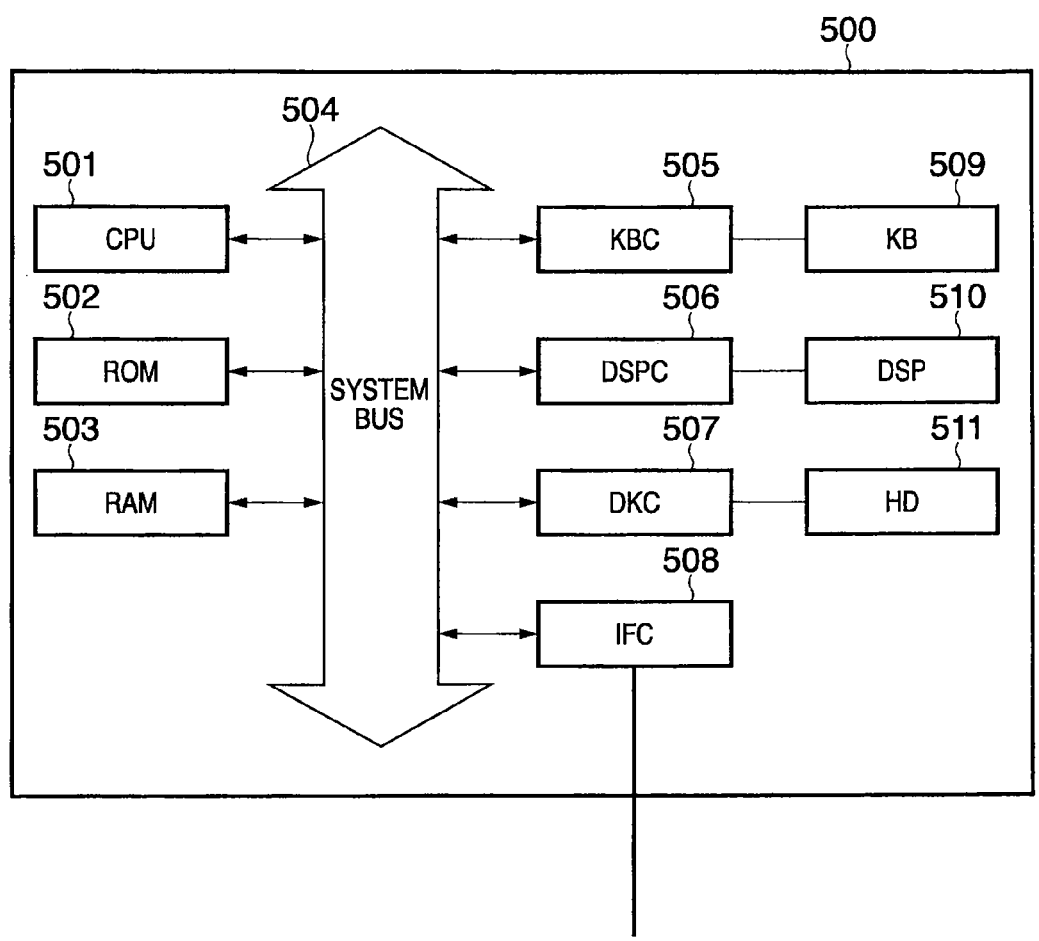
FIG. 5 is a block diagram showing the hardware configuration of a computer applicable to the client terminal apparatus 101, an authentication server 105, a DHCP server 106, and a manager server apparatus 103.

FIG. 5 is a block diagram showing the hardware configuration of a computer applicable to the client terminal apparatus 101, authentication server 105, DHCP server 106, and manager server apparatus 103. Note that these apparatuses have the same hardware configuration in the explanation of this embodiment. However, the hardware configuration is not limited to that shown in FIG. 5 as long as each apparatus can execute the following processing. Note also that these apparatuses need not have the same configuration.

A CPU 501 controls the whole computer by using programs and data stored in a ROM 502 and RAM 503, and also executes each processing (to be described later) performed by an apparatus to which this computer is applied.

The ROM 502 stores setting data, a boot program, and the like of this computer.

The RAM 503 provides an area for temporarily storing programs and data loaded from an HD (Hard Disk) 511, and programs and data externally received via an IFC (Interface Controller) 508. The RAM 503 can also appropriately provide a work area used by the CPU 501 to execute each processing.

Reference numeral 509 denotes a KB (Keyboard). The operator of this computer can input various instructions to the CPU 501 via a KBC (Keyboard Controller) 505 by operating the KB 509. Note that another device, e.g., a mouse, may also be used to input operations.

A DSP (Display) 510 is a CRT or liquid crystal screen, and can display the results of processing performed by the CPU 501 by images or characters. Note that the results of processing performed by the CPU 501 are output as data, so a DSPC (Display Controller) 506 suitably processes the data and also performs D/A conversion on the data, thereby outputting the data as an image signal to the DSP 510.

The HD 511 stores an OS (Operating System), and programs and data (including table data to be explained later) for allowing the CPU 501 to execute each processing (to be described later) performed by an apparatus to which this computer is applied. The CPU 501 properly loads the programs and data into the RAM 503 and executes processing by using the loaded programs and data. In this manner, an apparatus to which this computer is applied executes each processing (to be described later). In practice, a DKC (Disk Controller) 507 controls access to the HDD 511.

The IFC 508 is a device used to connect this computer to the LAN 100 or switching apparatus 104. As shown in FIG. 1, whether to connect the IFC 508 to the LAN 100 or switching apparatus 104 changes in accordance with an apparatus to which this computer is applied. This computer can communicate data with an external apparatus via the IFC 508.

A system bus 504 connects the CPU 501, ROM 502, RAM 503, KBC 505, DSPC 506, DKC 507, and IFC 508.

<Multi-Functional Peripheral>

FIG. 6 is a block diagram showing the hardware configuration of the multi-functional peripheral 102. As shown in FIG. 6, the multi-functional peripheral 102 roughly comprises a reader unit 601, printer unit 602, image input/output controller 603, and operation unit 604.

The reader unit 601 is connected to the printer unit 602 and image input/output controller 603. In accordance with instructions from the operation unit 604, the reader unit 601 reads an image of an original and outputs data of the read image to the printer unit 602 or image input/output controller 603. The printer unit 602 prints, on a printing sheet, the output image data from the reader unit 601 or image input/output controller 603. The operation unit 604 has a plurality of physical buttons. The operator of this apparatus can input various instructions to a core unit 611 (to be described later) by operating the operation unit 604. Note that when this apparatus is equipped with a touch-panel display screen, the operation unit 604 is obtained by integrating the display screen and an operation unit.

The image input/output controller 603 will be explained next. As shown in FIG. 6, the image input/output controller 603 comprises a facsimile unit 605, a file unit 606, an external storage device 607, an external interface unit 608, a formatter unit 609, an image memory unit 610, and the core unit 611.

The facsimile unit 605 is connected to the core unit 611 and a public circuit network 612. The facsimile unit 605 decompresses compressed image data received from the public circuit network 612, and transmits the decompressed image data to the core unit 611. The facsimile unit 605 also compresses image data transmitted from the core unit 611, and transmits the compressed image data to the designated transmission destination across the public circuit network 612.

The file unit 606 is connected to the core unit 611 and external storage device 607. The file unit 611 compresses image data transmitted from the core unit 611, and stores the compressed image data together with a keyword for search in the external storage device 607. The external storage device 607 is a large-capacity information storage device such as a hard disk. In addition, the file unit 606 searches the external storage device 607 for compressed image data corresponding to a keyword transmitted from the core unit 611, reads out and decompresses the found compressed image data, and transmits the decompressed data to the core unit 611.

The external interface unit 608 functions as an interface between the switching apparatus 104 and core unit 611. Job control data and image data are exchanged with the switching apparatus 104 via the external interface unit 608. The job control data includes a job control instruction transmitted together with PDL data. An example is an instruction to rasterize PDL data, print the obtained image data, and discharge printed sheets after staple sorting.

The formatter unit 609 is connected to the core unit 611, and rasterizes externally received PDL data into image data printable by the printer unit 602. The image memory unit 610 temporarily stores information from the reader unit 601 and information externally received via the external interface unit 608.

The core unit 611 performs data flow control between the reader unit 601, operation unit 604, facsimile unit 605, file unit 606, external interface unit 608, formatter unit 609, and image memory unit 610. The core unit 611 also executes each processing (to be described later) performed by the multi-functional peripheral 102.

Note that the essence of the following explanation remains the same even if a digital copying machine, a printer with a copy function, or a single-function printer is used instead of the multi-functional peripheral 102.

<Processing Executed by System>

Figure 2:
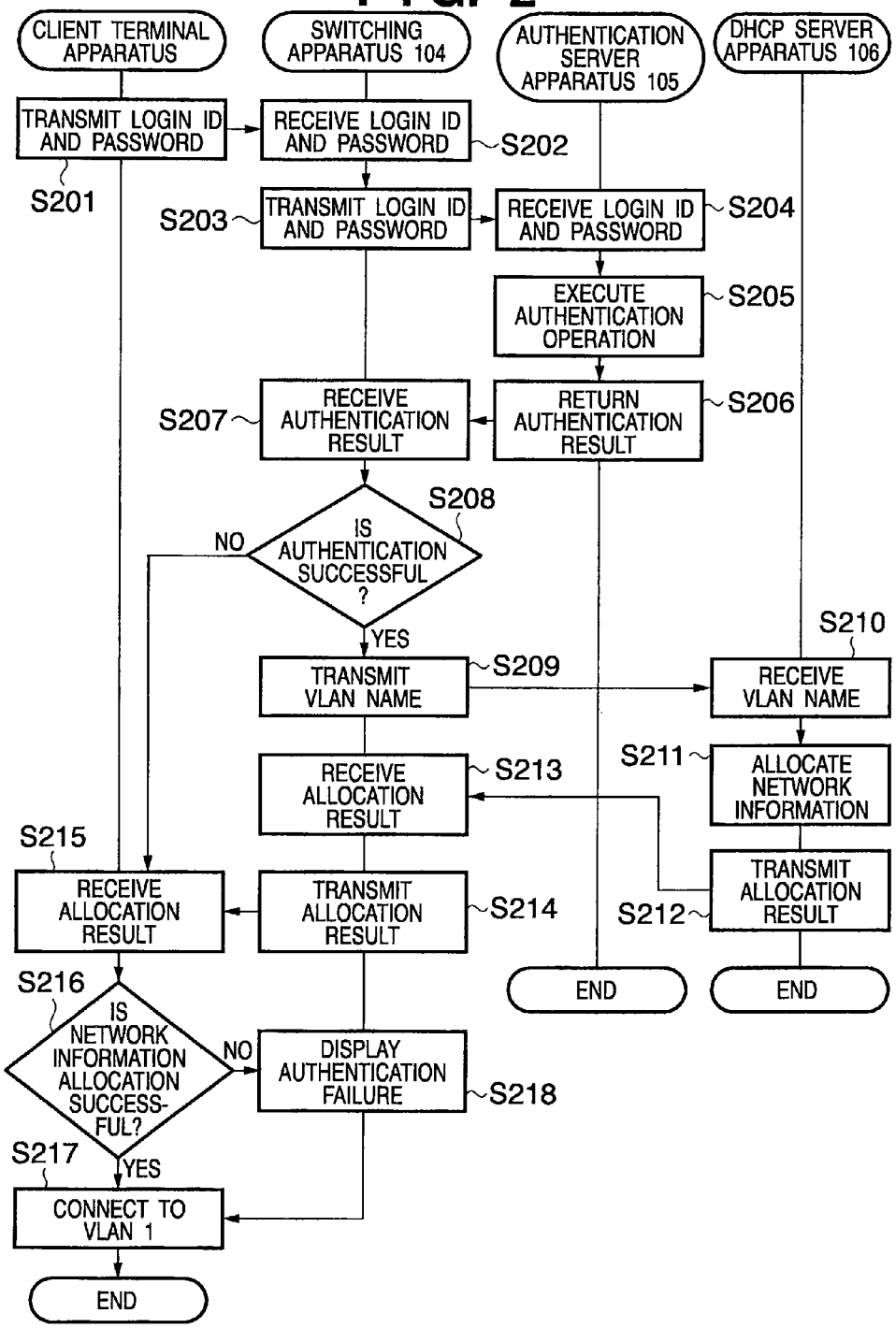
FIG. 2 is a flowchart showing the sequence of processing executed by this system when configuring a client terminal apparatus 101 on VLAN 1.

Processing executed by this system when additionally connecting a new apparatus to the VLAN will be explained below. As an example, processing executed by this system when configuring the client terminal apparatus 101 on VLAN 1 will be explained with reference to FIG. 2. Note that programs and data for allowing the CPU 501 of each apparatus (except for the switching apparatus 104) to execute processing performed by the apparatus shown in the flowchart of FIG. 2 are saved in the HD 511 of the apparatus. The CPU 501 appropriately loads the programs and data into the RAM 503 and executes the loaded programs. In this manner, each apparatus executes processing explained below. Assume that in the following explanation, "an authentication VLAN" which determines a VLAN to which a network device belongs on the basis of information of the user is introduced as a VLAN.

First, the operator of the client terminal apparatus 101 operates the KB 509 to input a login ID and password for VLAN 1, and the CPU 501 of the client terminal apparatus 101 loads the input login ID and password into the RAM 503 (step S201). When the operator inputs information indicating the completion of input of the login ID and password by using the KB 509, the CPU 501 of the client terminal apparatus 101 detects this information. In addition, the CPU 501 transmits a set of the login ID and password to the switching apparatus 104 (step S201). The switching apparatus 104 receives this set (step S202), and transfers the set to the authentication server 105 (step S203).

Figure 3:
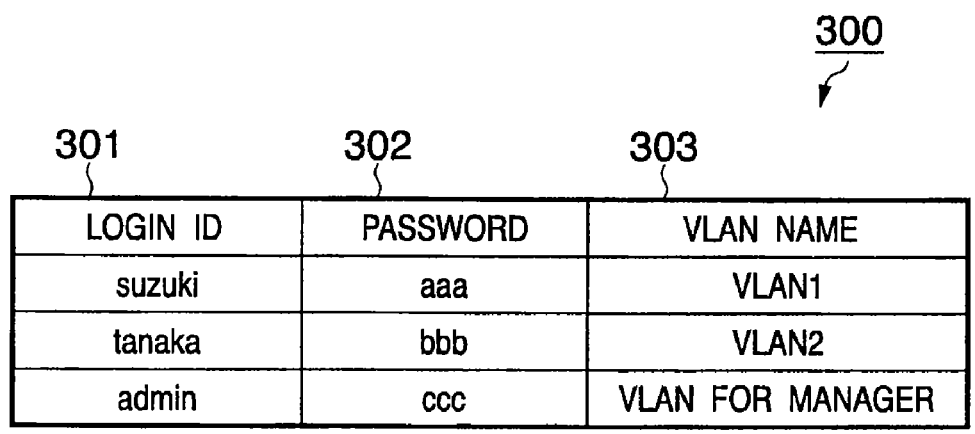
FIG. 3 is a view showing an example of the arrangement of an authentication table used in an authentication process.

The CPU 501 of the authentication server 105 loads this set received via the IFC 508 into the RAM 503 (step S204), and performs an authentication process by using the received set (step S205). FIG. 3 is a view showing an example of the arrangement of an authentication table for use in this authentication process. An authentication table 300 registers, for each type of VLAN, a set of a login ID 301 necessary to log in to the VLAN, a password 302, and a name (VLAN name) 303 of the VLAN.

When logging in to, e.g., VLAN 1 in the case shown in FIG. 3, it is necessary to input login ID=suzuki and password=aaa. A set of the input login ID and password is transmitted to the authentication server 105. The authentication server 105 checks whether this set is registered in the authentication table 300.

In this embodiment, therefore, the client terminal apparatus 101 is authenticated by whether the set of the login ID and password received in step S204 is registered in the authentication table 300 shown in FIG. 3. Note that the data of the authentication table 300 shown in FIG. 3 is stored in the HD 511 of the authentication server 105, and suitably loaded into the RAM 503 of the authentication server 105 where necessary.

The explanation will return to FIG. 2. If it is determined by the authentication process in step S205 that the set of the login ID and password received in step S204 is registered in the authentication table 300 shown in FIG. 3, the process advances to step S206. In step S206, an authentication result "success" and a VLAN name corresponding to this set are transmitted to the switching apparatus 104.

On the other hand, if the set of the login ID and password received in step S204 is not registered in the authentication table 300 shown in FIG. 3, an authentication result "failure" is transmitted to the switching apparatus 104 (step S206).

The switching apparatus 104 receives only the authentication result or a set of the authentication result and VLAN name (step S207), and refers to the received authentication result (step S208). If the authentication result is "failure", the switching apparatus 104 advances the process to step S215, and notifies the client terminal apparatus 101 of the information. If the authentication result is "success", the switching apparatus 104 advances the process to step S209, and transmits the VLAN name received in step S207 to the DHCP server 106 (step S209).

Figure 4:
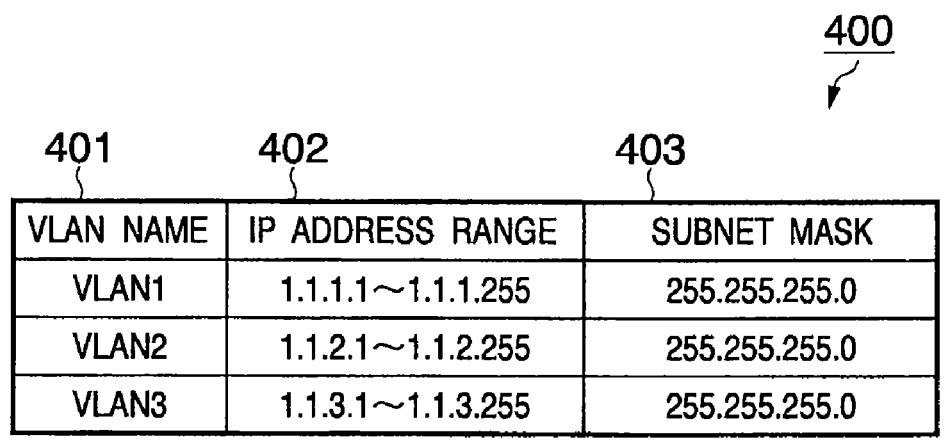
FIG. 4 is a view showing an example of the arrangement of a table used to determine an IP address range and subnet mask from a VLAN name received in step S210.

The DHCP server 106 receives the VLAN name (step S210), and advances to step S211. In step S211, the DHCP server 106 determines connection setting information (network information), such as an IP address and subnet mask, which the client terminal apparatus 101 uses on a VLAN specified by this VLAN name. FIG. 4 is a view showing an example of the arrangement of a table used to determine an IP address range and subnet mask from the VLAN name received in step S210. As shown in FIG. 4, a table 400 registers an IP address range 402 and subnet mask 403 corresponding to a VLAN name 401.

In step S211, therefore, the DHCP server 106 first determines an IP address range and subnet mask corresponding to the VLAN name received in step S210 by referring to the table 400 shown in FIG. 4. Since the VLAN name is VLAN 1 in this embodiment, the DHCP server 106 determines that the ID address range is "1.1.1.1 to 1.1.1.255" and the subnet mask is "255.255.255.0". In step S211, the DHCP server 106 then specifies an IP address usable within the determined ID address range.

The DHCP server 106 thus determines the IP address and subnet mask which the client terminal apparatus 101 uses on VLAN 1. Note that this embodiment uses only the IP address and subnet mask as the connection setting information, but information usable as the connection setting information is not limited to the IP address and subnet mask. For example, a gateway address and DNS server name may also be used. In this case, the gateway address and DNS server name must be registered in addition to the IP address range and subnet mask in association with each VLAN name in the table 400. Note that the data of the table 400 is stored in the HDD 511 of the DHCP server 106, and suitably loaded into the RAM 503 of the DHCP server 106 where necessary.

Then, the DHCP server 106 transmits the connection setting information (in this embodiment, the IP address and subnet mask) determined in step S211 and "success" to the switching apparatus 104 (step S212) If the VLAN name received in step S210 does not exist in the table 400, the DHCP server 106 transmits "failure" to the switching apparatus 104 in step S212.

The switching apparatus 104 receives a set of the connection setting information and "success" or only "failure" (step S213), and transfers the received information to the client terminal apparatus 101 (step S214). The client terminal apparatus 101 receives the set of the connection setting information and "success" or only "failure" (step S215), and checks whether "success" or "failure" is received (step S216). If "failure" is received, the client terminal apparatus 101 advances the process to step S218, displays information indicating the failure of connection to VLAN 1 on the display screen of the DSP 510 (step S218), and terminates the process.

If "success" is received, the client terminal apparatus 101 advances the process to step S217, and connects to VLAN 1 by using the received connection setting information (step S217).

Figure 7:
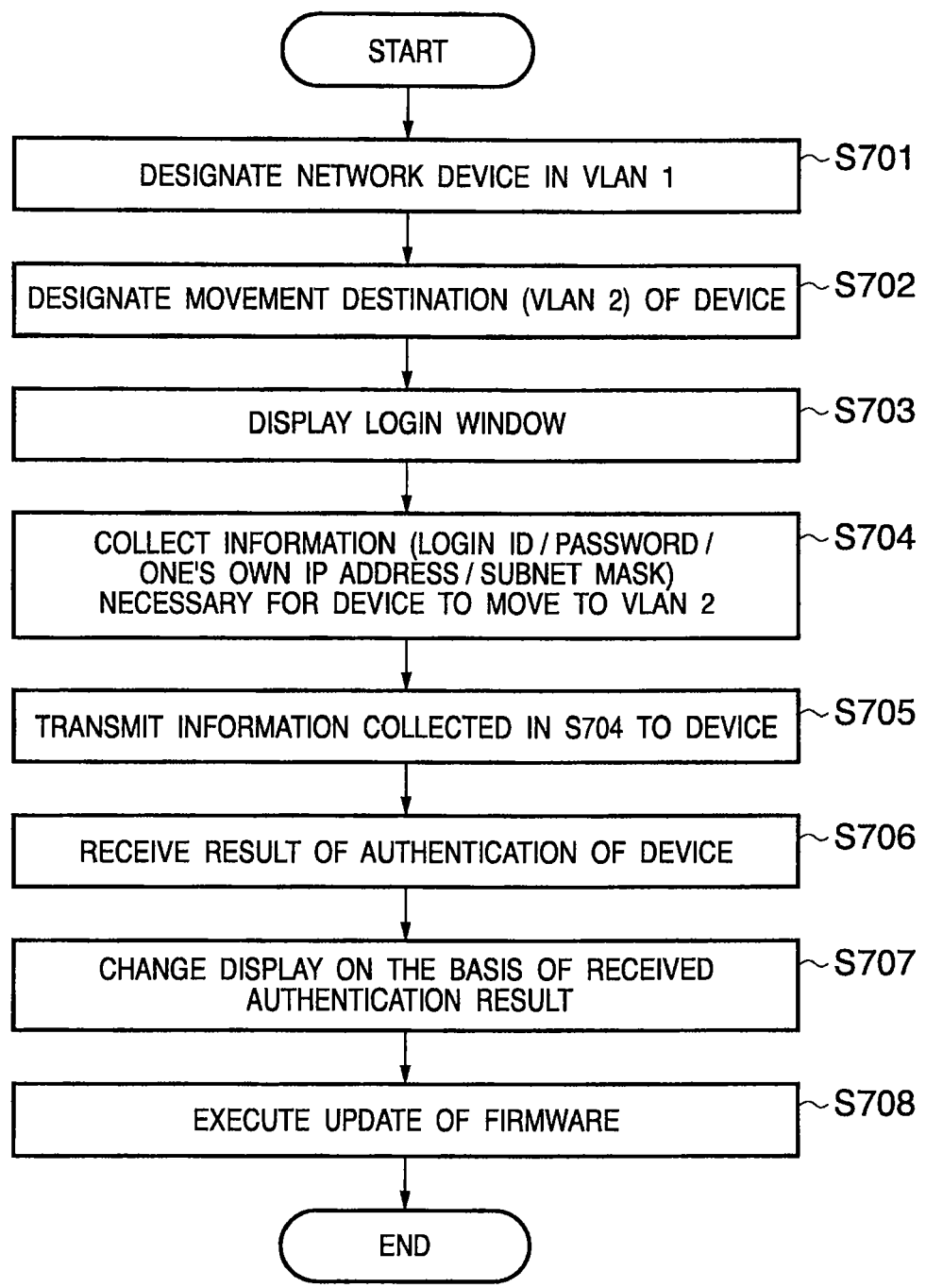

Processing performed by the manager server apparatus 103 will be explained below on the basis of the processing described above. More specifically, processing when the manager server apparatus 103 accesses and updates the firmware of the multi-functional peripheral 102 connected to a VLAN (VLAN 1) different from a VLAN (VLAN 2) to which the manage server apparatus 103 is connected will be explained with reference to FIG. 7. Note that programs and data for allowing the CPU 501 of the manager server apparatus 103 to execute processing corresponding to the flowchart shown in FIG. 7 are stored in the HD 511 of the manager server apparatus 103. The CPU 501 properly loads the programs and data into the RAM 503 and executes the processing by using the loaded programs and data. In this way, the manager server apparatus 103 executes each process explained below.

Figure 8:
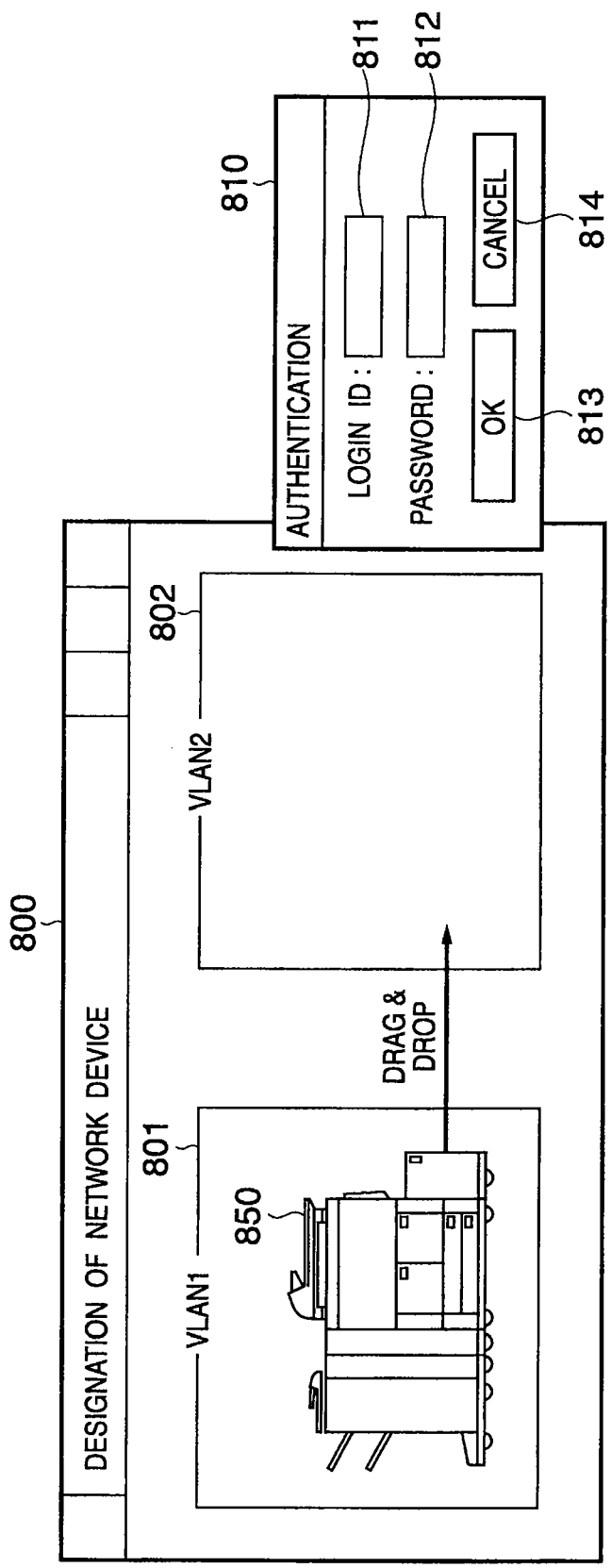
FIG. 8 is a view showing examples of contents displayed on a GUI 800 and authentication window 810 used to input an instruction to connect an apparatus, which is connected to VLAN 1, to VLAN 2.

First, the operator of the manager server apparatus 103 operates the KB 509 to input an instruction to cause the DSP 510 to display a GUI 800 shown in FIG. 8. When detecting this instruction, the CPU 501 loads programs and data related to the GUI 800 from the HD 511 into the RAM 503, and executes the loaded programs. As a consequence, the display screen of the DSP 510 displays the GUI 800, FIG. 8 is a view showing display examples of the GUI 800 used to input instructions to connect an apparatus, which is connected to VLAN 1, to VLAN 2, and an authentication window 810 (to be described later). In FIG. 8, reference numeral 800 denotes a window of the GUI; and 801, an area for displaying an icon indicating an apparatus presently connected to VLAN 1. Referring to FIG. 8, an icon 850 indicating the multi-functional peripheral 102 is displayed.

The icon displayed in the area 801 will be explained below. As described previously, routing is performed from VLAN 2 to VLAN 1. Therefore, the manager server apparatus 103 can access VLAN 1 and collect information concerning an apparatus presently connected to VLAN 1. As a consequence, an icon indicating the apparatus presently connected to VLAN 1 can be displayed in the area 801. Note that it is also possible to display, e.g., the apparatus name by a character string instead of the icon.

Reference numeral 802 denotes an area to which the icon of an apparatus to be connected to VLAN 2 is to be moved. Although details will be explained later, if there is an apparatus to be connected to VLAN 2 among apparatuses presently connected to VLAN 1, an icon indicating the apparatus is moved from the area 801 to the area 802.

While the GUI 800 as described above is displayed on the display screen of the DSP 510, if the operator of the manager server apparatus 103 designates the icon of an apparatus to be connected to VLAN 2 by using, e.g., the KB 509 or a mouse (not shown), the CPU 501 detects this designation and changes the display form of this icon (step S701). Note that the display form can be changed by, e.g., changing the display color or displaying a frame.

Subsequently, the operator moves the designated icon to the area 802 by drag & drop or the like by using, e.g., the KB 509 or the mouse (not shown), thereby completing the movement (e.g., releasing the pressing of a mouse button). The CPU 501 detects this movement, and determines that the connection destination of the apparatus indicated by the designated icon is VLAN 2 (step S702).

In this embodiment, the multi-functional peripheral 102 is to be connected to VLAN 2. Therefore, the operator designates the icon of the multi-functional peripheral 102, and moves the icon from the area 801 to the area 802 by drag & drop.

Then, the CPU 501 displays the authentication window (login window) 810 shown in FIG. 8 on the display screen of the DSP 510 (step S703). The authentication window 810 includes an area 811 for inputting a login ID, an area 812 for inputting a password, an OK button 813, and a cancel button 814.

Since the multi-functional peripheral 102 is to be connected to VLAN 2 in this embodiment, the operator inputs a login ID and password necessary to log in to VLAN 2 in the areas 811 and 812, respectively. When the operator designates the OK button 813 by using, e.g., the KB 509 or the mouse (not shown) after inputting the login ID and password, the CPU 501 detects this designation, and loads the login ID and password input in the areas 811 and 812 into the RAM 503. In addition, the CPU 501 loads the IP address and subnet mask of the manager server apparatus 103 stored in the HD 511 into the RAM 503 (step S704). The CPU 501 then transmits these data to the multi-functional peripheral 102 (step S705). Note that if the cancel button 814 is designated, the CPU 501 terminates this process.

When a set of the login ID, password, IP address, and subnet mask is transmitted to the multi-functional peripheral 102, the multi-functional peripheral 102 performs a process of connecting itself to VLAN 2. This process will be described later. Note that in this embodiment, the IP address and subnet mask need not be transmitted because the multi-functional peripheral 102 does not use them.

Figure 9:
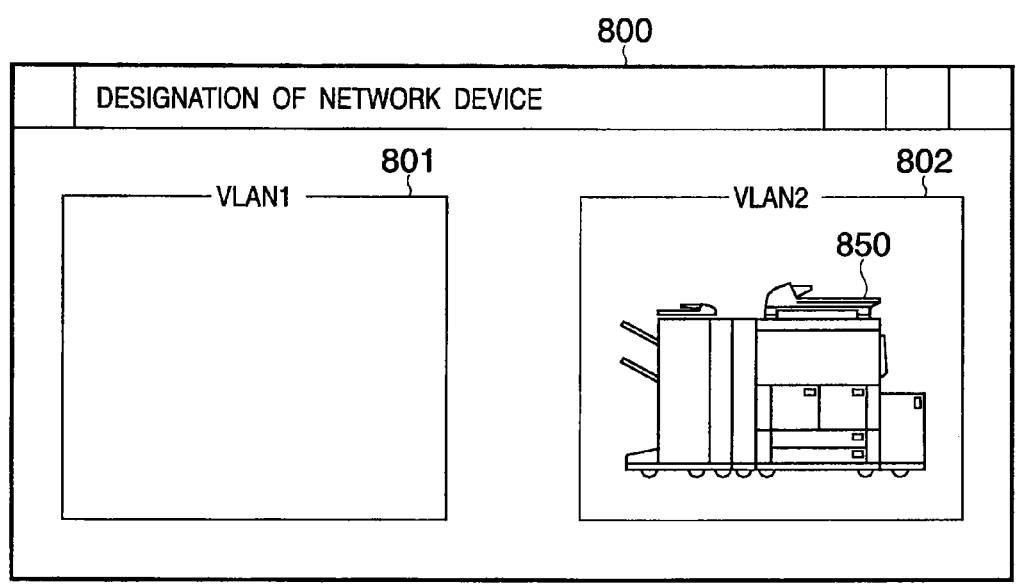
FIG. 9 is a view showing an example of a GUI displayed on the display screen of a DSP 510 of the manager server apparatus 103 when the multi-functional peripheral 102 has connected to VLAN 2.

Meanwhile, the manager server apparatus 103 waits for the result (authentication result) of connection success/failure from the multi-functional peripheral 102. When the multi-functional peripheral 102 transmits the authentication result to the IFC 508 of the manager server apparatus 103, the CPU 501 detects this authentication result and loads it into the RAM 503 (step S706). If the authentication result indicates that the multi-functional peripheral 102 is authenticated, as shown in FIG. 9, the CPU 501 displays the icon 850 of the multi-functional peripheral 102 in the area 802 (step S707). That is, the CPU 501 displays information indicating that the multi-functional peripheral 102 has connected to VLAN 2. FIG. 9 is a view showing an example of a GUI displayed on the display screen of the DSP 510 of the manager server apparatus 103 when the multi-functional peripheral 102 has connected to VLAN 2.

The CPU 501 then accesses the multi-functional peripheral 102, and transmits, to the multi-functional peripheral 102, an instruction to update the firmware held in the external storage device 607 of the multi-functional peripheral 102. Accordingly, the multi-functional peripheral 102 updates the firmware in accordance with the contents of the instruction. Note that the process which the manager server apparatus 103 performs on the multi-functional peripheral 102 when the multi-functional peripheral 102 becomes accessible (when the multi-functional peripheral 102 is connected to VLAN 2) is not limited to the updating process, and various processes are possible.

Since there is no routing from VLAN 1 to VLAN 2, the manager server apparatus 103 alone can operate the multi-functional peripheral 102 while the firmware is being updated. Therefore, the above process allows safe and easy update of the firmware.

Figure 10:
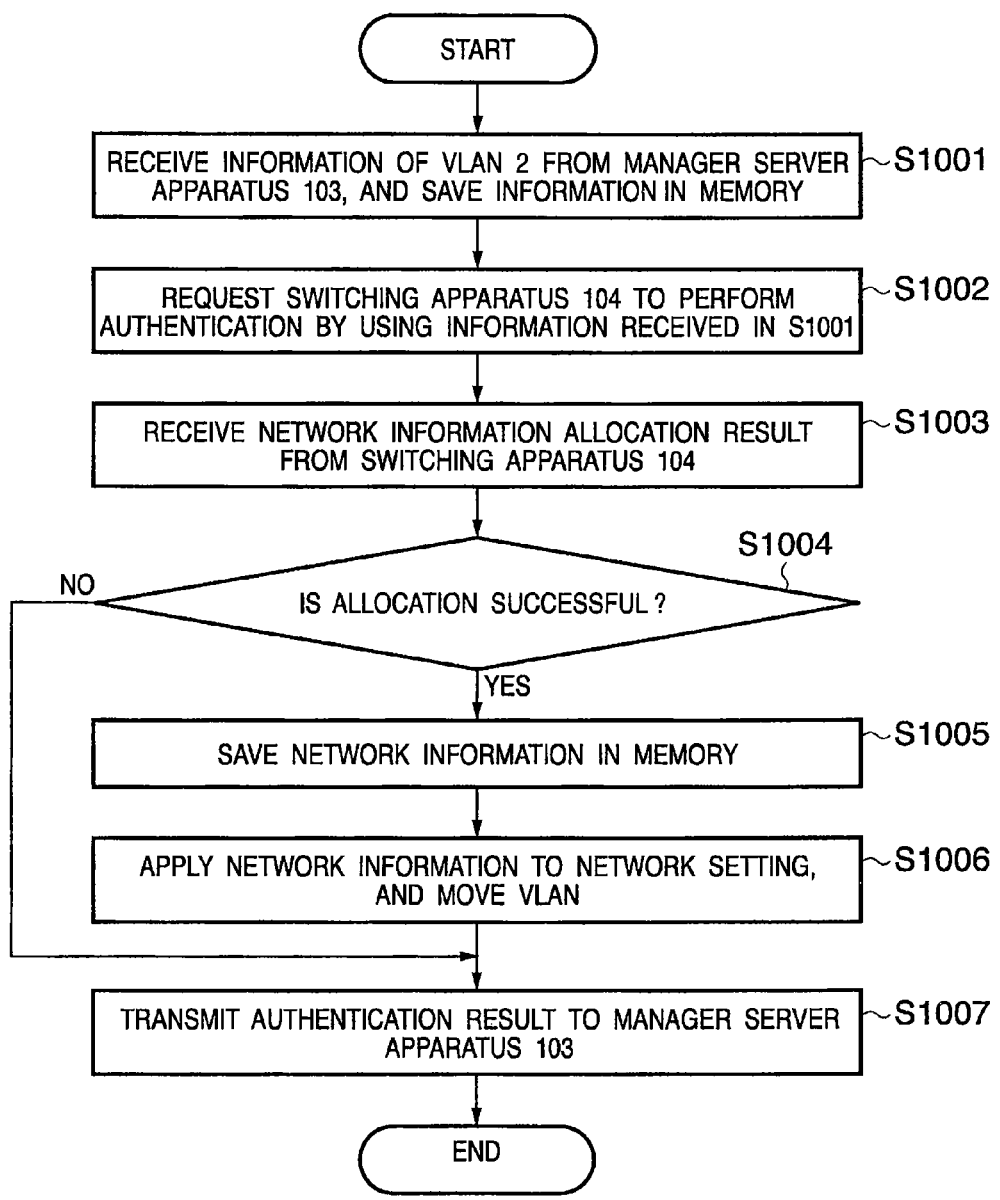
FIG. 10 is a flowchart showing the sequence of processing executed by the multi-functional peripheral 102 when the manager server apparatus 103 has transmitted a set of a login ID, password, IP address, and subnet mask in step S705, and the multi-functional peripheral 102 has received the set.

Then, processing executed by the multi-functional peripheral 102 when the manager server apparatus 103 has transmitted the set of the login ID, password, IP address, and subnet mask in step S705 and the multi-functional peripheral 102 has received the set will be explained below with reference to FIG. 10. Note that programs and data for allowing the core unit 611 to execute the processing corresponding to the flowchart shown in FIG. 10 are stored in an internal memory (not shown) of the core unit 611. Accordingly, the core unit 611 executes the processing by using the programs and data, thereby allowing the multi-functional peripheral 102 to execute each process explained below.

The core unit 611 executes step S1001 when receiving the set of the login ID, password, IP address, and subnet mask transmitted from the manager server apparatus 103 in step S705. More specifically, the received set is stored in one of the external storage device 607, the image memory unit 610, and the internal memory of the core unit 611. Note that in the following explanation, one of these three storage devices is used as a memory for storing externally received data, so these three storage devices will be collectively simply referred to as a memory in some cases.

The core unit 611 then transmits the received set of the login ID and password to the switching apparatus 104 (step S1002). The switching apparatus 104 transfers this set to the authentication server 105. The core unit 611 receives, via the switching apparatus 104, only the result of authentication performed by the authentication server 105 by using the login ID and password, or a set of the authentication result and the connection setting information obtained by the DHCP server 106 (step S1003).

The processes in steps S1002 and S1003 are respectively performed in the same manners as in steps S201 and S215 described previously. The processes performed by the switching apparatus 104, authentication server 105, and DHCP server 106 after the process in step S1002 is performed are also performed in the same manners as for the processes (steps S202 to S214) explained with reference to FIG. 2.

That is, the authentication server 105 receives the set of the login ID and password transmitted to the switching apparatus 104 in step S1002, and specifies the corresponding VLAN name in the table 300 shown in FIG. 3. Since the multi-functional peripheral 102 is to be connected to VLAN 2 in this embodiment, the login ID and password for logging in to VLAN 2 are transmitted to the authentication server 105. Accordingly, the authentication server 105 specifies the VLAN name of VLAN 2.

If the VLAN name corresponding to the set of the login ID and password exists in the table 300, the authentication server 105 transmits the VLAN name to the DHCP server 106, and transmits the authentication result ("success") to the multi-functional peripheral 102. The DHCP server 106 determines connection setting information corresponding to the VLAN name on the basis of the table 400 shown in FIG. 4, and transmits the determined connection setting information to the multi-functional peripheral 102. Consequently, the multi-functional peripheral 102 can obtain only the authentication result or a set of the authentication result and connecting setting information.

The explanation will return to FIG. 10. The core unit 611 checks whether "success" or "failure" is received as the authentication result (step S1004). If "failure" is received, the core unit 611 advances the process advances to step S1007. If "success" is received, the core unit 611 advances the process to step S1005, and stores the connection setting information received together with "success" in the memory (step S1005).

The core unit 611 connects to VLAN 2 by using the connection setting information stored in the memory in step S1005 (step S1006). After that, the core unit 611 transmits the authentication result to the manager server apparatus 103 (step S1007). Note that the authentication result cannot be transmitted to the manager server apparatus 103 in some cases because the connection is not permitted. In this case, however, the manager server apparatus can also determine that the authentication has failed if there is no response for a predetermined time.

In this embodiment as is evident from the above explanation, the manager of a network device can manage it from a remote place while interrupting access from other users. This implements safe and easy network device management.

Also, the manager of a network device need not go to the installation place of the network device in order to directly operate it. This significantly reduces the network device management cost.

Second Embodiment

FIG. 11 is a flowchart of processing performed by a multi-functional peripheral 102 when a manager server apparatus 103 has transmitted a set of a login ID, password, IP address, and subnet mask in step S705 described above, and the multi-functional peripheral 102 has received the set. Note that programs and data for allowing a core unit 611 to execute the processing corresponding to the flowchart shown in FIG. 11 are stored in an internal memory (not shown) of the core unit 611. Therefore, the core unit 611 executes the processing by using the programs and data, thereby allowing the multi-functional peripheral 102 to execute each process explained below.

First, processes in steps S1101 to S1105 are respectively the same as those in steps S1001 to S1005 described above, so an explanation thereof will be omitted. Then, in step S1106, the core unit 611 compares a subnet based on the IP address and subnet mask transmitted from the manager server apparatus 103 with a subnet based on connection setting information received in step S1103. Note that in this embodiment, the connection setting information is a set of an IP address and subnet mask.

If the comparison result indicates that the two subnets match, the multi-functional peripheral 102 determines that it can belong to the same subnet as the manager server apparatus 103, i.e., VLAN 2, and advances the process to step S1107. Processes in steps S1107 and S1108 are respectively the same as those in steps S1006 and 1007, so an explanation thereof will be omitted. On the other hand, if the comparison result indicates that the two subnets do not match, the multi-functional peripheral 102 advances the process to step S1108.

In this embodiment, the mobility to a target VLAN is confirmed in step S1106. Unlike in the first embodiment, therefore, no apparatus moves to any VLAN except for a target one.

Note that the processes explained in each embodiment described above can also be implemented by a configuration other than the system configuration shown in FIG. 1. That is, the several apparatuses shown in FIG. 1 may also be integrated into one apparatus, or processes performed by one apparatus may also be assigned to a plurality of apparatuses.

Other Embodiments

Note that the present invention can be applied to a system comprising a plurality of devices (e.g., a host computer, interface, reader, and printer) or to an apparatus (e.g., a copying machine or facsimile apparatus) comprising a single device.

Note also that the object of the present invention can also be achieved by supplying, to a system or apparatus, a storage medium recording the program code of software for implementing the functions of the embodiments described above. In this case, a computer (or a CPU or MPU) of the system or apparatus implements the above functions by reading out and executing the program code stored in the storage medium. In this case, the storage medium storing this program code constitutes the present invention.

As this storage medium for supplying the program code, it is possible to use, e.g., a floppy (registered trademark) disk, hard disk, optical disk, magnetooptical disk, CD-ROM, CD-R, magnetic tape, nonvolatile memory card, and ROM.

Also, besides the functions of the above embodiments are implemented by executing the readout program code by the computer, the present invention naturally includes a case where an OS (Operating System) or the like running on the computer performs part or the whole of actual processing on the basis of instructions by the program code, thereby implementing the functions of the embodiments.

Furthermore, the present invention of course also includes a case where the functions of the above embodiments are implemented after the program code read out from the storage medium is written in a memory of a function expansion board inserted into the computer or of a function expansion unit connected to the computer. That is, after the program code is written in the memory, a CPU or the like of the function expansion board or function expansion unit performs part or the whole of actual processing on the basis of instructions by the program code, thereby implementing the above functions.

The present invention is not limited to the above embodiments and various changes and modifications can be made within the spirit and scope of the present invention. Therefore, to apprise the public of the scope of the present invention, the following claims are made.

This application claims the benefit of Japanese Patent Application No. 2006-053799, filed on Feb. 28, 2006, which is hereby incorporated by reference herein in its entirety.

What is claimed is:

1. An information processing apparatus connected to a first virtual network comprising:
   a designating unit configured to designate, as an apparatus to be managed, an apparatus on which the information processing apparatus executes specific processing, among apparatuses connected to the second virtual network;
   a transmitting unit configured to transmit, to said apparatus to be managed, authentication information necessary to connect to the first virtual network;
   a receiving unit configured to receive, from said apparatus to be managed, information indicating that said apparatus to be managed has connected to the first virtual network by using the authentication information if said apparatus to be managed has determined to be able to connect to the first virtual network by using the authentication information and has changed connection destination from the second virtual network to the first virtual network by setting a network setting information of the first virtual network; and
   a processing unit configured to access said apparatus to be managed and execute specific processing, when receiving information indicating that said apparatus to be managed has connected to the first virtual network;
   wherein the said processing unit executes a process of updating firmware of said apparatus to be managed;
   wherein the said apparatus is comprised in a system which is configured by the said first virtual network as a virtual network and a second virtual network different from the first virtual network, wherein routing from the first virtual network to the second virtual network is possible and routing from the second virtual network to the first virtual network is impossible in the system.

2. The apparatus according to claim 1, wherein the virtual network is a virtual local area network (VLAN).

3. The apparatus according to claim 1, wherein when said designating unit designates an object corresponding to said apparatus to be managed, among objects displayed on a user interface and corresponding to apparatuses connected to the second virtual network, and the designated object is dropped in a specific area on the user interface to indicate that said apparatus to be managed corresponding to the dropped object is to be connected to the first virtual network, said transmitting unit transmits, to said apparatus to be managed, authentication information necessary to connect to the first virtual network.

4. A system comprising;
   an information processing apparatus connected to a first virtual network as a virtual network, an authentication server connected to a second virtual network and having an authentication function, a network setting issuing server having a network setting function, and an apparatus which performs predetermined processing, wherein routing from the first virtual network to the second virtual network is possible and routing from the second virtual network to the first virtual network is impossible in the system, and wherein
   said information processing apparatus comprises:
   a designating unit configured to designate, as an apparatus to be managed, an apparatus on which said information processing apparatus executes specific processing, among apparatuses connected to the second virtual network;
   a first transmitting unit configured to transmit, to said apparatus to be managed, authentication information necessary to connect to the first virtual network;
   a first receiving unit configured to receive, from said apparatus to be managed, information indicating that said apparatus to be managed has connected to the first virtual network by using the authentication information, if said apparatus to be managed has determined to be able to connect to the first virtual network by using the authentication information and has changed connection destination from the second virtual network to the first virtual network by setting a network setting information of the first virtual network; and
   a processing unit configured to access said apparatus to be managed and execute specific processing, when receiving information indicating that said apparatus to be managed has connected to the first virtual network; wherein the said processing unit executes a process of updating firmware of said apparatus to be managed;
   said apparatus to be managed comprises:
   a second receiving unit configured to receive the authentication information transmitted by said first transmitting unit;
   a second transmitting unit configured to transmit the authentication information received by said second receiving unit to said authentication server;
   a third receiving unit configured to receive an authentication result which is transmitted from said authentication server as a result of an authentication process performed by said authentication server by using the authentication information, and indicates whether said apparatus to be managed is connectable to the first virtual network, and to receive connection setting information from said network setting issuing server if said apparatus to be managed is connectable;
   a connection processing unit configured to perform a connection process of changing connection destination from the second virtual network to the first virtual network by connecting said apparatus to be managed to the first virtual network by using the connection setting information if said apparatus to be managed is connectable to the first virtual network; and
   a third transmitting unit configured to transmit the authentication result to said information processing apparatus,
   said authentication server comprises:
   a first holding unit configured to hold a set of the authentication information and virtual network information corresponding to the authentication information and indicating a connectable virtual network;
   a search unit configured to search said first holding unit for virtual network information corresponding to the authentication information transmitted by said second transmitting unit, thereby performing an authentication process; and
   a fourth transmitting unit configured to transmit, to said apparatus to be managed, an authentication result indicating that said apparatus to be managed is connectable to the first virtual network, if the virtual network information corresponding to the authentication information transmitted by said second transmitting unit is held in said first holding unit, and to transmit the corresponding virtual network information to said network setting issuing server, and said network setting issuing server comprises:
a second holding unit configured to hold a set of the virtual network information and the connection setting information; and
a fifth transmitting unit configured to search said second holding unit for connection setting information corresponding to the virtual network information transmitted by said fourth transmitting unit, and to transmit the connection setting information to said apparatus to be managed.

5. The system according to claim 4, further comprising a switching apparatus which connects the first virtual network and the second virtual network, wherein data communication between the information processing apparatus connected to the first virtual network and the apparatus connected to the second virtual network is performed via said switching apparatus.

6. The system according to claim 4, wherein said first transmitting unit further transmits, to said apparatus to be managed, a network address of said information processing apparatus connected to the first virtual network, said second receiving unit further receives the network address, and said connection processing unit performs the connection process if a subnet based on the connection setting information matches a subnet based on the network address.

7. An information processing method performed by an information processing apparatus comprised in a system which is configured by a first virtual network and a second virtual network different from the first virtual network, and connected to the first virtual network, the method comprising:
  a designating step of designating, as an apparatus to be managed, an apparatus on which the information processing apparatus executes specific processing, among apparatuses connected to the second virtual network;
  a transmitting step of transmitting, to the apparatus to be managed, authentication information necessary to connect to the first virtual network;
  a receiving step of receiving, from the apparatus to be managed, information indicating that the apparatus to be managed has connected to the first virtual network by using the authentication information, if said apparatus to be managed has determined to be able to connect to the first virtual network by using the authentication information and has changed destination connection from the second virtual network to the first virtual network by setting a network setting information of the first virtual network; and
  a processing step of accessing the apparatus to be managed and executing specific processing when information indicating that the apparatus to be managed has connected to the first virtual network is received, wherein said specific processing comprises updating firmware to be managed; and
  wherein routing from the first virtual network to the second virtual network is possible and routing from the second virtual network to the first virtual network is impossible in the system.

8. The method according to claim 7, wherein the virtual network is a virtual local area network (VLAN).

9. The method according to claim 7, wherein when, among objects displayed on a user interface and corresponding to apparatuses connected to the second virtual network, an object corresponding to the apparatus to be managed is designated in the designating step, and the designated object is dropped in a specific area on the user interface to indicate that the apparatus to be managed corresponding to the dropped object is to be connected to the first virtual network, authentication information necessary to connect to the first virtual network is transmitted to the apparatus to be managed in the transmitting step.

10. A computer readable storage medium having stored within a control program, comprised in a system which is configured by a first virtual network and a second virtual network different from the first virtual network, wherein the control program causes a computer of an information processing apparatus connected to the first virtual network to perform or instruct the performing of an information processing method, which comprises:
  a designating step of designating, as an apparatus to be managed, an apparatus on which the information processing apparatus executes specific processing, among apparatuses connected to the second virtual network;
  a transmitting step of transmitting, to the apparatus to be managed, authentication information necessary to connect to the first virtual network;
  a receiving step of receiving, from the apparatus to be managed, information indicating that the apparatus to be managed has connected to the first virtual network by using the authentication information; if said apparatus to be manage has determined to be able to connect to the first virtual network by using the authentication information and has changed connection destination from the second virtual network to the first virtual network by setting a network setting information of the first virtual network; and
  a processing step of accessing the apparatus to be managed and executing specific processing, when information indicating that the apparatus to be managed has connected to the first virtual network is received, wherein said specific processing comprises updating firmware to be managed; and
  wherein routing from the first virtual network to the second virtual network is possible and routing from the second virtual network to the first virtual network is impossible in the system.

* * * * *